(12) United States Patent
Shin

(10) Patent No.: US 10,546,666 B2
(45) Date of Patent: Jan. 28, 2020

(54) HIGH PERFORMANCE MULTILAYER INSULATION COMPOSITE FOR HIGH VOLTAGE APPLICATIONS

(71) Applicant: Ohio Aerospace Institute, Brook Park, OH (US)

(72) Inventor: Euy-sik Shin, Brook Park, OH (US)

(73) Assignees: OHIO AEROSPACE INSTITUTE, Brook Park, OH (US); U.S. GOVERNMENT AS REPRESENTED BY THE ADMINISTRATOR OF THE NATIONAL AERONAUTICS AND SPACE ADMINISTRATION, Washington, DC (US)

( * ) Notice: Subject to any disclaimer, the term of this patent is extended or adjusted under 35 U.S.C. 154(b) by 0 days.

(21) Appl. No.: 16/381,144

(22) Filed: Apr. 11, 2019

(65) Prior Publication Data

US 2019/0326034 A1    Oct. 24, 2019

Related U.S. Application Data

(60) Provisional application No. 62/659,234, filed on Apr. 18, 2018.

(51) Int. Cl.
| | | |
|---|---|---|
| *H01B 7/02* | (2006.01) | |
| *H01B 7/295* | (2006.01) | |
| *H01B 3/42* | (2006.01) | |
| *H01B 7/18* | (2006.01) | |
| *H01B 7/00* | (2006.01) | |
| *H02G 3/00* | (2006.01) | |

(52) U.S. Cl.
CPC ............ *H01B 7/0225* (2013.01); *H01B 3/427* (2013.01); *H01B 7/0009* (2013.01); *H01B 7/1805* (2013.01); *H01B 7/295* (2013.01); *H02G 3/00* (2013.01)

(58) Field of Classification Search
CPC .. H01B 7/0225; H01B 7/0208; H01B 7/0009; H01B 7/1805; H01B 7/295; H01B 3/427
See application file for complete search history.

(56) References Cited

U.S. PATENT DOCUMENTS

| | | | | |
|---|---|---|---|---|
| 2010/0116541 A1* | 5/2010 | Eshima | ................ | H01B 7/1865 174/388 |
| 2017/0365374 A1* | 12/2017 | Coderre | ............... | H01B 7/0225 |
| 2018/0322980 A1* | 11/2018 | Leach | ..................... | H01B 3/30 |

* cited by examiner

*Primary Examiner* — Timothy J Thompson
*Assistant Examiner* — Amol H Patel
(74) *Attorney, Agent, or Firm* — Pearne & Gordon LLP

(57) ABSTRACT

A thin micro-multilayer electrical insulator having a plurality of layers of polymeric materials is high performance and lightweight. The insulator provides a structured material with improved dielectric strength and partial corona discharge resistance that can be used in high voltage and high temperature applications. The durable insulator is well suited for use in insulating high voltage aircraft wiring and power transmission composites in hybrid and all electric airplanes. The insulator can have multiple layers of different polymeric materials such as fluorine-containing polymers and polyimides.

23 Claims, 5 Drawing Sheets

HIGH PERFORMANCE MULTILAYER INSULATION COMPOSITE FOR HIGH VOLTAGE APPLICATIONS

This application claims the benefit of U.S. provisional application Ser. No. 62/659,234 filed Apr. 18, 2018, the contents of which are incorporated herein in their entirety by reference.

STATEMENT OF GOVERNMENT SUPPORT

This invention was made with government support under Contract No. NNC13BA10B awarded by the National Aeronautics and Space Administration. The government has certain rights in this invention.

FIELD

The invention relates to insulation composites for high voltage applications and, in particular, wire insulation composites having improved dielectric breakdown voltage and dielectric strength that can be used for electrical aircraft wiring and power transmission bus, and many other high power cables and components for high voltage and high temperature applications.

BACKGROUND

Wire and cables are continually being improved to accommodate the data-centric architecture of machines and electronics, for example, the modern aircraft. Aircraft engines heavily influence demand for wire that can perform at high operating temperatures. Future hybrid or all electric aircraft wiring and power transmissions will further increase the demand for materials that can perform in high voltage environments, especially under a reduced pressure atmosphere. Selection of lighter weight and more efficient solutions will also be important to reduce the amount of wiring in future aircrafts and updating existing fleets.

Protecting insulation on the wiring also must be able to withstand the high voltage and high temperature conditions. The insulation materials preferably have reduced weight and volume, improved durability, high dielectric strength and high partial discharge resistance. Insulation can be made of a single material or contain several materials, such as polymers, in layers to provide dielectric insulation, corona resistance, thermal protection, EMI shielding, abrasion resistance and moisture resistance. Current insulation materials often cannot fulfill all the requirements. For instance, polyimide films are known to be good dielectric materials with high temperature capability, but are susceptible to moisture and arc tracking.

Conventional insulation approaches to handle high voltage include the use of thick layers of insulation, which add significant weight gain to the entire composite. While commercial insulations having multiple layers such as Teflon-Kapton-Teflon provide one solution, the present invention provides newly developed multilayer insulation that overcomes known disadvantages of current insulation and exhibits improved dielectric breakdown voltage and dielectric strength when compared to conventional insulation composites.

SUMMARY

In a first aspect, there is an insulated conductor (e.g., wire) that includes a conductor having an outer surface; a multilayer insulating composite containing an inner insulating layer, a plurality of intermediate insulating layers and an outer insulating layer; wherein the inner insulating layer has a thickness of from 0.01 mm to 0.15 mm and overlies the outer surface of the conductor; the plurality of intermediate insulating layers contain a first intermediate insulating layer overlying the inner insulating layer and an outermost intermediate insulating layer, wherein the plurality of intermediate insulating layers includes at least 3 layers; the outer insulating layer having a thickness of from 0.01 mm to 0.15 mm and overlying the outermost intermediate insulating layer of the plurality of intermediate insulating layers.

In some examples of aspect 1, the multilayer insulating composite includes an overall thickness of from 0.1 mm to 0.5 mm, or 0.2 mm to 0.5 mm, or 0.25 mm to 0.5 mm, or 0.3 mm to 0.5 mm.

In another example of aspect 1, the inner insulating layer and the outer insulating layer of the multilayer insulating composite contain the same polymeric material, for example, both are made of the same material such as a fluorine-containing polymer or a polyimide polymer.

In another example of aspect 1, the inner insulating layer, the plurality of intermediate insulating layers and the outer insulating layer of the multilayer insulating composite each include at least one polymeric material selected from the group of a fluorine-containing polymer, a polyimide polymer and a polyethylene polymer.

In another example of aspect 1, the inner insulating layer is in direct bonding with the conductor, the first intermediate insulating layer is in direct bonding with the inner insulating layer, and the outermost intermediate insulating layer of the plurality of intermediate insulating layers is in direct bonding with the outer insulating layer.

In another example of aspect 1, the plurality of insulating layers further includes a second intermediate insulating layer positioned between the first intermediate insulating layer and the outermost intermediate insulating layer, wherein the plurality of intermediate insulating layers have an overall thickness of from 0.1 mm to 0.45 mm, or 0.15 mm to 0.4 mm, or 0.2 mm to 0.35 mm. In one example, the overall or total thickness of the plurality of intermediate insulating layers.

In another example of aspect 1, the plurality of intermediate insulating layers further includes a third intermediate insulating layer positioned between the second intermediate insulating layer and the outermost intermediate insulating layer.

In another example of aspect 1, the multilayer insulating composite has an operative temperature of from 220° C. to 300° C.

In another example of aspect 1, the multilayer insulating composite comprises a dielectric breakdown voltage of from 25 kV to 50 kV when tested in an insulating oil, for example, PM-125 phenylmethylsiloxane, and preferably from 30 kV to 50 kV.

In another example of aspect 1, the multilayer insulating composite comprises a dielectric strength of from 80 kV/mm to 130 kV/mm when tested in an insulating oil, for example, PM-125 phenylmethylsiloxane.

In another example of aspect 1, the inner insulating layer is made up of a fluorine-containing polymer (e.g., perfluoroalkoxy (PFA)), the first intermediate insulating layer and the outermost intermediate insulating layer both are made up of a polyimide polymer (e.g., poly (4,4'-oxydiphenylene-pyromellitimide)), and the outer insulating layer is made up of the fluorine-containing polymer, wherein no insulating layer of the multilayer insulating composite has a thickness of more than 0.10 or 0.15 mm.

In another example of aspect 1, the plurality of intermediate insulating layers comprises 3 to 33 intermediate insulating polymeric layers and each alternating layer of the plurality of intermediate insulating layers includes a fluorine-containing polymer or a polyimide polymer such that every other layer of the plurality contains the same polymeric material whereas each of the remaining alternating layers of the plurality contain a different polymeric material. For example, every other layer of the plurality of intermediate insulating layers includes a fluorine-containing polymer (e.g., perfluoroalkoxy (PFA)) and each of the remaining alternating layers of the plurality include a polyimide polymer.

In another example of aspect 1, the insulated conductor is installed in an aircraft.

In another example of aspect 1, the insulated conductor is a part of a plurality of the same insulated wires, wherein the plurality of insulated wires are stranded together to form a core that is covered by a sheath.

In a second aspect, there is an electrical insulator that includes a multilayer insulating composite having an inner insulating polymeric layer for overlying a substrate, a plurality of 3 to 33 intermediate insulating polymeric layers overlying the inner insulating polymeric layer, and an outer insulating polymeric layer overlying the plurality of intermediate insulating polymeric layers, wherein the multilayer insulating composite has an overall thickness of from 0.1 mm to 0.5 mm and the multilayer insulating composite has a dielectric breakdown voltage of from 25 kV to 50 kV; the inner insulating polymeric layer has a thickness of from 0.01 mm to 0.15 mm and contains a fluorine-containing polymer or a polyimide polymer; and the outer insulating layer has a thickness of from 0.01 mm to 0.15 mm and contains a fluorine-containing polymer or a polyimide polymer.

In some examples of aspect 2, the multilayer insulating composite comprises a dielectric strength of from 80 kV/mm to 130 kV/mm when tested in an insulating oil, for example, PM-125 phenylmethylsiloxane.

In another example of aspect 2, the substrate being a wire, for example, a wire installed on an aircraft or a wire that is part of a cable core.

In another example of aspect 2, the inner insulating polymeric layer and the outer insulating polymeric layer being made up of the same polymeric material.

In another example of aspect 2, the plurality of intermediate polymeric layers include a first intermediate polymeric layer and an outermost intermediate polymeric layer, the first intermediate polymeric layer and the outermost intermediate polymeric layer being made of the same material, for example, a material not included in the inner insulating polymeric layer and the outer insulating polymeric layer.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

The accompanying drawing is included to provide a further understanding of principles of the disclosure, and is incorporated in and constitutes a part of this specification. The drawing illustrates some examples(s), and together with the description serves to explain, by way of example, principles and operation thereof. It is to be understood that various features disclosed in this specification and in the drawing can be used in any and all combinations. By way of non-limiting example the various features may be combined with one another as set forth in the specification, above, as aspects.

BRIEF DESCRIPTION OF THE DRAWING

The above and other features, examples and advantages of aspects of the examples disclosed in the present specification are better understood when the following detailed description thereof is read with reference to the accompanying drawing, in which.

DETAILED DESCRIPTION

The terminology as set forth herein is for description of the embodiments only and should not be construed as limiting the invention as a whole. Herein, when a range such as 5-25 (or 5 to 25) is given, this means preferably 5 or more and, separately and independently, preferably 25 or less. In an example, such a range defines independently not less than 5, and separately and independently, not more than 25.

Micro-multilayered structures have been discovered for providing an insulation source having improved dielectric breakdown voltage and dielectric strength as compared with conventional bulk insulation structures. The multilayer insulation structures provide weight and volume reduction, improved durability, increased heat resistance and high corona partial discharge resistance. The structures of the present disclosure can be adapted to many high voltage or high temperature applications, for example, future hybrid or all electric aircraft wiring and power transmission composites, high power cables and equipment, electric motors, interconnects, etc.

The multilayered structures or insulating composites can be an insulating source for a conducting substrate, for example, a metal wire. The multilayer insulating composite, excluding any underlying substrate, can have a thickness measured from the surface top outermost surface to the bottom outermost surface of the composite. For example, the thickness of the multilayer insulating composite can be in the range of 0.1 to 0.5 mm, 0.15 to 0.5 mm, 0.2 to 0.5 mm, or 0.25 to 0.5 mm. In some embodiments, the multilayer insulating composite can have a thickness in the range of 0.1 to 0.35 mm, 0.1 to 0.3 mm, 0.1 to 0.25 mm or 0.1 to 0.2 mm, including any ranges and subranges therebetween. The thickness of the multilayer insulating composite is shown in FIG. 1 as reference 10.

Figure 1:
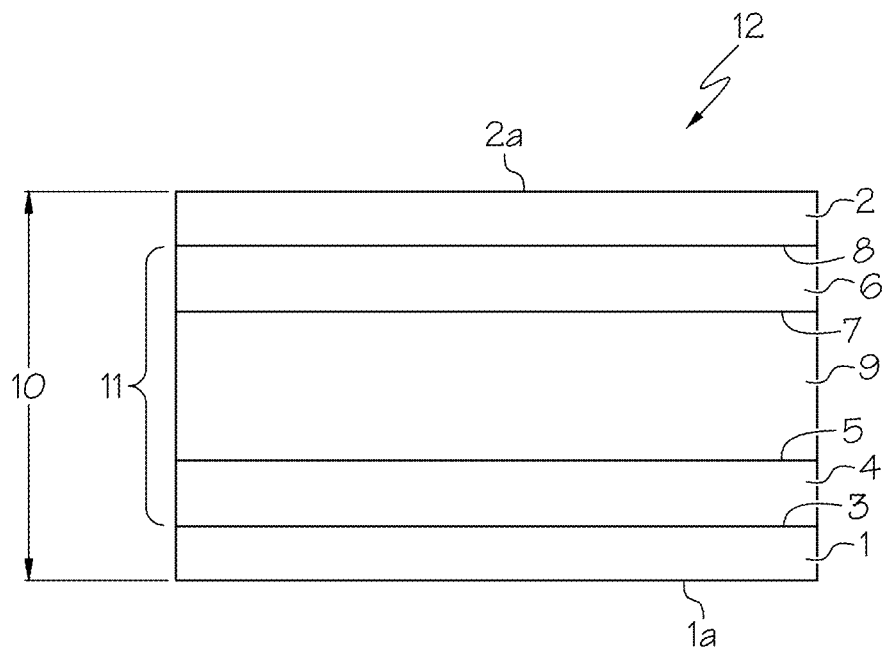
FIG. 1 shows a cross-section view of a multilayer insulating composite.

As shown in FIG. 1, the multilayer insulating composite 12 can include a total of at least 5 layers. In one or more embodiments, the composite 12 can include a total of 5 to 35 layers, 5 to 25 layers, 5 to 15 layers, or 6, 7, 8, 9, 10, 11, 12 or 13 layers, including any range and subrange of layers therebetween.

The multilayer insulating composite 12 includes an inner insulating layer 1 having an outward contact surface 1a for overlying a substrate (e.g., a conductor). The inner insulating layer 1 forms the inner face of the composite 12 that can be in direct bonding with the outermost surface of the underlying substrate. The inner insulating layer 1 can have a thickness in the range of 0.01 mm to 0.15 mm, 0.015 mm to 0.13 mm, 0.02 mm to 0.10 mm, or 0.025 mm to 0.08 mm, or 0.03, 0.04, 0.05, 0.055, 0.06 or 0.07 mm, including any ranges and subranges therebetween.

In one or more embodiments, the contact surface 1a of the inner insulating layer 1 can encase or surround a conductor, for example, directly bond the entire outer diameter surface of a wire. Opposite the bonded surface 1a, the inner insulating layer 1 has another face that is arranged under a plurality of intermediate insulating layers 11. As shown, the inner insulating layer 1 bonds the first intermediate insulating layer 4 of the plurality of intermediate insulating layers 11 at interface 3. Preferably, the inner insulating layer 1 is in direct bonding with the first intermediate insulating layer 4.

FIG. 1 shows the plurality of intermediate insulating layers 11 arranged between inner insulating layer 1 and outer insulating layer 2 such that the plurality of layers 11 overlies the inner insulating layer 1. In one or more embodiments, the plurality of intermediate insulating layers 11 are the only layers or material positioned between the inner insulating layer 1 and outer insulating layer 2. The plurality of intermediate insulating layers 11 can include a total of 3 to 33 layers, 3 to 23 layers, 3 to 13 layers, or 4, 5, 6, 7, 8, 9, 10, 11 or 12 layers, including any range and subrange of layers therebetween. Each layer of the plurality of intermediate insulating layers 11 (e.g., layers 4, 6, 9) can have a thickness in the range of 0.01 mm to 0.15 mm, 0.015 mm to 0.13 mm, 0.02 mm to 0.10 mm, or 0.025 mm to 0.08 mm, or 0.03, 0.04, 0.05, 0.055, 0.06 or 0.07 mm, including any ranges and subranges therebetween.

The first intermediate insulating layer 4 is arranged between the inner insulating layer 1 and the remaining layers 6, 9 of the plurality 11. Intermediate insulating layer 9 represents one or more layers, for example, a second, third, fourth or fifth intermediate insulating layer, which are all arranged between the first intermediate insulating layer 4 and the outermost intermediate insulating layer 6. Intermediate insulating layer 9 can include 3 to 31 layers, 3 to 21 layers, 3 to 11 layers, or 4, 5, 6, 7, 8, 9 or 10 layers, including any range and subrange of layers therebetween. Intermediate insulating layer 9, or the innermost layer to layer 4 if more than one layer, overlies and is preferably in direct bonding with the first intermediate insulating layer 4 at interface 5. Each of the layers, if more than one, of the intermediate insulating layer 9 are preferably in direct bonding with one another to form a stack arranged between, and in bonding with, layers 4 and 6, which are further sandwiched between layers 1 and 2. Each layer, if more than one, of the intermediate insulating layer 9 can have a thickness in the range of 0.01 mm to 0.15 mm, 0.015 mm to 0.13 mm, 0.02 mm to 0.10 mm, or 0.025 mm to 0.08 mm, or 0.03, 0.04, 0.05, 0.055, 0.06 or 0.07 mm, including any ranges and subranges therebetween.

Intermediate insulating layer 9, or the outermost layer to layer 6 if more than one layer, is arranged under and is preferably in direct bonding with outermost intermediate insulating layer 6 at interface 7. As shown, outermost intermediate insulating layer 6 is in direct bonding with outer insulating layer 2 at interface 8. The outer insulating layer 2, opposite interface 8, has an outer contact surface 2a that represents the exterior of the multilayer insulating composite 12. The outer insulating layer 2 is one layer and can have a thickness in the range of 0.01 mm to 0.15 mm, 0.015 mm to 0.13 mm, 0.02 mm to 0.10 mm, or 0.025 mm to 0.08 mm, or 0.03, 0.04, 0.05, 0.055, 0.06 or 0.07 mm, including any ranges and subranges therebetween.

In one or more embodiments, one or more, or all of the layers of the multilayer insulating can include or be made up of a polymeric material. Any suitable electrical insulating polymeric material can be selected. For example, the polymeric material can include the following materials or derivatives thereof, polyethylene (e.g., poly(ethylene terephthalate), polyethylene sulfides, Ryton), polybutylenes (e.g., polybutylene terephthalate), polypropylenes, polyphenylene oxide, butyl rubbers, silicone rubbers, neoprenes, poly MMA, nylon, nylon 66, polyesters (e.g., Mylar), polyimides (e.g., Kapton®, Kapton® HN, Kapton® HPP-ST, poly (4,4'-oxydiphenylene-pyromellitimide), Kaptrex®, Meldin®, Vespel®), polyetherimides (e.g., Ultem®), polyamides (e.g., Nomex®), fluoropolymers (e.g., Kynar®, perfluoroalkoxy (PFA), polytetrafluorethylene (PTFE)), polyether ketones (e.g., polyetherether-ketones (PEEK)), polycarbonates (e.g., Lexan™, Makrolon®), polyolefins, polystyrenes (Rexolite®), polysulfones, polyethersulfones, polyacrylates, polyurethanes, polyvinylchlorides, and any combinations thereof. The polymeric materials can be crystalline or amorphous.

In one or more embodiments, at least 30, 40 or 50% of the layers of the multilayer insulating composite contain a polyimide polymer. For example, at least 30, 40 or 50% of the layers of the multilayer insulating composite are made up of only polyimide polymer. In another example, all of the layers containing polyimide polymer can contain the same polyimide polymer material. The remaining layers of the multilayer insulating composite can contain a non-polyimide polymer, for example, a fluoropolymer or a polyethylene polymer. In another example, the non-polyimide polymer layers can contain a heat-fusible polymer material. Heat-fusible polymer materials can include crystalline polymer compounds having a melt temperature in the range of 100° C. to 400° C., 125° C. to 350° C., 150° C. to 300° C. Heat-fusible materials can be used to adhere polymeric insulating layers to one another.

Examples of heat-fusible polymer materials can include the following materials or derivatives thereof, polyethylenes (e.g., poly(ethylene terephthalate), polybutylenes (e.g., polybutylene terephthalate), polypropylenes, polyphenylene oxide, fluoropolymers (e.g., perfluoroalkoxy (PFA), polytetrafluorethylene (PTFE)), polyetherether-ketones (PEEK), and any combinations thereof. The heat-fusible polymer materials can be arranged in the multilayer insulating composite in any suitable manner. In an example, the heat-fusible polymer materials can be used as layers arranged in an alternating position with electrically insulating layers. For instance, a heat-fusible polymer layer can be positioned between each polyimide polymer layer, wherein either a heat-fusible polymer layer forms the inner insulating layer and the outer insulating layer of the composite or the polyimide polymer layer forms the inner insulating layer and the outer insulating layer of the composite.

In one or more embodiments, the layers of the multilayer insulating composite can include the use of only two polymeric materials, wherein each layer of the composite is made up of only one of the two polymeric materials. For example, at least 40%, 45% or 50% of the layers of the multilayer insulating composite can be made up of a polyimide polymer material, wherein the remaining layers are made up of non-polyimide polymer material.

In one embodiment, a polyimide polymer material forms the inner and outer insulating layers of the multilayer insulating composite. The remaining layers positioned between the inner and outer insulating layers of the composite, for example the plurality of intermediate insulating layers 11 in FIG. 1, can be alternating layers of a polyimide polymer material and another insulating material, such as a non-polyimide polymer material. Preferably, the other insulating materials are used as the layers that directly bond the inner and outer insulating layers of polyimide polymer material. In one example, the other insulating materials can have a lower melt temperature than the polyimide polymer material such that upon heating the multilayer insulating composite, the other insulating materials can bond (e.g. fuse bond) or adhere the polyimide polymer material layers together to form a laminated composite.

The multilayer insulating composite can be fabricated with conventional methods designed to prepare laminated composites. Example methods include calendaring, compression molding, vacuum-bag molding, autoclave processing, extrusion, stamping, laminating, and 3D printing.

In one example, the individual layers, such as in the form of sheets, of the multilayer insulating composite can be positioned directly on top of one another in the desirable order at or near room temperature (e.g., 20 to 30° C.). The arranged layers can optionally be pressed together under a constant compression force before heat is applied to the layers to facilitate adhering the layers together. To protect the outermost layers of the stack up, protective plates or sheets can be arranged to sandwich stack and contact the compression source, such as a plate of a clamp or press. In one or more embodiments, an outer contact surface of the layers can be in contact with a conductor such that the stack of layers is adhered directly to and in contact with a conductor (e.g., a wire) to be insulated.

The layers can be heated to a temperature range of 100° C. to 400° C., 200° C. to 375° C., 300° C. to 350° C. for a time period suitable to adhere or fuse bond the layers together, for instance, a time period in the range of 2 to 30 minutes, 3 to 25 minutes, 5 to 20 minutes, or at least 8, 10, 12 or 15 minutes. The optional compression of the layers can be released subsequent to the heating cycle being completed, for example, at or before the heated layers are cooled to ambient temperature.

Heating of the layers can be accomplished by any suitable method, for example, in a convection or air-circulated oven, in a hot press, or in an autoclave. Heating can include a determined ramp up cycle, for example, 2° C./min to 20° C./min, 4° C./min to 15° C./min, 5° C./min to 12° C./min, 6° C./min, 7° C./min, 8° C./min, 9° C./min, 10° C./min or 11° C./min. Cooling of the formed multilayer insulating composite can be accomplished with forced cooling or by exposing the composite to ambient conditions outside of the heating device.

In another example, the multilayer insulating composite can be extruded directly onto a conductor. Heat can be applied during extrusion to aid melt bonding an outer surface of the composite onto a conductor.

Figure 2:
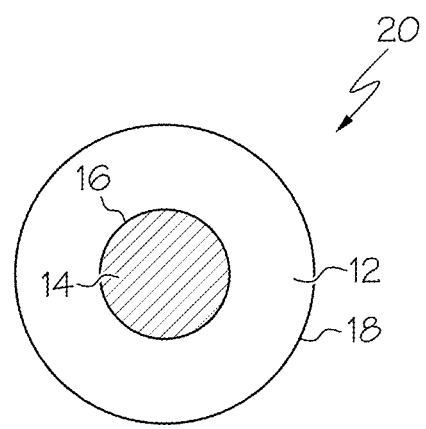
FIG. 2 shows a cross-section view of a conducting substrate (either circular or rectangular or any other shapes) encased by a multilayer insulating composite.

The multilayer insulating composite can be adhered to an electrical conductor to provide a protective barrier from the surrounding environment. The electrical conductor is preferably composed of a metal, for example, copper or copper alloy, tin-, silver- or nickel-plated copper. The multilayer insulating composite can be a component of an electrical box or housing, a wire coating or cable, junctions such as connectors, interconnects, bus bars, terminal blocks, busses, etc. FIG. 2 shows one example of the multilayer insulating composite 12 as a wire insulator to form an insulated wire 20. The outward contact surface 1a of the inner insulating layer 1 of the composite 12 overlies and directly contacts the outer surface of a wire conductor 14 at interface 16. The composite 12 can be optionally adhered wire conductor 14 with an adhesive if desirable. The outer surface 18 of the composite 12 can optionally be covered with a protective sheath, not shown.

The insulated wire 20 can be one of a plurality of similar insulated wires that forms a core of a cable. The plurality of wires 20 can be optionally bundled or stranded together and covered with a sheath to form a cable. If flame-retardant materials such as polyphenylene oxide, polyarylate, polyether ether ketone and polyether imide are used for the outer insulating layer of the composite, the insulated conductor, wire or cable can be used in applications that require a flame-resistant conductor. Use of a flame-retardant sheath containing metal hydroxides such as aluminum hydroxide or magnesium hydroxide can improve the fire-resistant performance of the conductor.

In order to promote a further understanding of the invention, the following examples are provided. These examples are shown by way of illustration and not limitation.

Example 1

Test coupons were prepared to measure the dielectric strength of individual materials and multilayer insulating composites. The test coupons were approximately 1.25 inch by 1 inch rectangles fabricated by compression molding.

Insulating layers were positioned in a stacked configuration of a 1/16 inch thick aluminum sheet that was cleaned with isopropyl alcohol and dried before the layers were applied. The stack of layers was then sandwiched with another 1/16 thick aluminum sheet that was also cleaned with isopropyl alcohol and dried to form an assembly. The layers arranged between the aluminum sheets were compressed together by use of binder clips, generally two small binder clips opposite one another and two large binder clips opposite one another. The assembly was placed in an air-circulated oven at room temperature and heated to 350° C. with a ramp up of 8° C./min. Once a temperature of 350° C. was obtained, the assembly was held at 350° C. for a period of about 10 minutes.

Alternatively, test coupons were made by the method above except that 3/16 inch tool steel molding plates were used in place of aluminum sheets and compression loading was maintained with the use of Inconel HT sealing clips, which are rated to 370° C. and provide about 1.5 lbs clamping force per clip. 12-20 clips were generally used for each test coupon, typically 1.25 inch by 3 inch in dimensions.

Tables 1 and 2 below tabulate the measured data obtained from evaluating the test coupons in an average of two to four test specimens.

TABLE 1

| Sample | Layer Sequence/Condition | Total Thickness (mm) | PFA Thickness (mm) | PI Thickness (mm) |
|---|---|---|---|---|
| PFA | PFA, 5 mil (0.127 mm) | 0.125 | 0.125 | |
| PFA | PFA, 5 mil, exposed to 350° C. for 8 min. | 0.112 | 0.112 | |
| PI ST | PI ST, 2 mil (0.0508 mm) | 0.05 | | 0.05 |
| PI ST | PI ST, 2 mil, pre-shrunk at 350° C. for 8 min. | 0.055 | | 0.055 |
| PI KBF | PI KBF, 1 mil (0.0254 mm) | 0.025 | | 0.025 |
| PI KBF | PI KBF, 1 mil, exposed to 350° C. for 8 min. | 0.025 | | 0.025 |
| PI KBF | PI KBF, 5 mil | 0.126 | | 0.126 |
| PI KBF | PI KBF, 5 mil, exposed to 350° C. for 8 min. | 0.128 | | 0.128 |
| BS11 | 5 mil PFA/5 mil PI KBF/5 mil PFA, fuse-bonded between Cu | 0.363 | 0.233 | 0.130 |
| BS12 | 5 mil PI KBF/5 mil PI PFA/5 mil PI KBF, fuse-bonded | 0.378 | 0.118 | 0.26 |
| BS13 | 2 mil PFA/5 mil PI KBF/5 mil PFA/5 mil PI KBF/2 mil PFA, fuse-bonded between Cu | 0.455 | 0.195 | 0.26 |
| BS14 | 5 mil PI KBF/5 mil PFA/1 mil PI KBF/5 mil PFA/5 mil PI KBF, fuse-bonded | 0.478 | 0.192 | 0.286 |
| BS15 | [2 mil PFA/2 mil PI KBF]$_3$/2 mil PFA, fuse-bonded between Cu | 0.363 | 0.198 | 0.165 |
| BS16 | 1 mil PI KBF/2 mil PFA/2 mil PI KBF/5 mil PFA/2 mil PI KBF/2 mil PFA/1 mil PI KBF, fuse-bonded | 0.345 | 0.183 | 0.162 |
| BS17 | [1 mil PI KBF/2 mil PFA]$_4$/1 mil PI KBF, fuse-bonded | 0.335 | 0.205 | 0.13 |
| BS17N | [1 mil PIKBF/1 mil PFA]$_4$/1 mil PIKBF, fuse bonded | 0.234 | 0.107 | 0.127 |
| BS18 | [0.5 mil PFA/1 mil PIKBF]$_6$/0.5 mil PFA, fuse-bonded between Cu | 0.242 | 0.090 | 0.152 |
| BS19 | [1 mil PIKBF/0.5 mil PFA]$_4$/1 mil PIKBF, fuse bonded | 0.173 | 0.046 | 0.127 |

PFA is perfluoroalkoxy;
PI ST is Kapton film;
PI KBF is Kapton bagging film

TABLE 2

| Sample | Layer Sequence/Condition | Avg. Voltage, kV | Avg. Strength, kV/mm | Avg. Strength by PI, kV/mm |
|---|---|---|---|---|
| PFA | PFA, 5 mil (0.127 mm) | 17.7 | 141.8 | |
| PFA | PFA, 5 mil, exposed to 350° C. for 8 min. | 14 | 124.7 | |
| PI ST | PI ST, 2 mil (0.0508 mm) | 10.2 | 203.7 | |
| PI ST | PI ST, 2 mil, pre-shrunk at 350° C. for 8 min. | 9.9 | 179.4 | |
| PI KBF | PI KBF, 1 mil (0.0254 mm) | 6.3 | 251.2 | 251.2 |
| PI KBF | PI KBF, 1 mil, exposed to 350° C. for 8 min. | 6.7 | 267.2 | 267.2 |
| PI KBF | PI KBF, 5 mil | 23.5 | 186.6 | 186.6 |
| PI KBF | PI KBF, 5 mil, exposed to 350° C. for 8 min. | 23.7 | 186.1 | 186.1 |
| BS11 | 5 mil PFA/5 mil PI KBF/5 mil PFA, fuse-bonded between Cu | 25.8 | 71.3 | 198.7 |
| BS12 | 5 mil PI KBF/5 mil PI PFA/5 mil PI KBF, fuse-bonded | 37.8 | 100 | 148.8 |
| BS13 | 2 mil PFA/5 mil PI KBF/5 mil PFA/5 mil PI KBF/2 mil PFA, fuse-bonded between Cu | 46.7 | 102.6 | 183.7 |
| BS14 | 5 mil PI KBF/5 mil PFA/1 mil PI KBF/5 mil PFA/5 mil PI KBF, fuse-bonded | 41.6 | 87.2 | 145.5 |

TABLE 2-continued

| Sample | Layer Sequence/Condition | Avg. Voltage, kV | Avg. Strength, kV/mm | Avg. Strength by PI, kV/mm |
|---|---|---|---|---|
| BS15 | [2 mil PFA/2 mil PI KBF]$_3$/2 mil PFA, fuse-bonded between Cu | 40.7 | 112.2 | 246.5 |
| BS16 | 1 mil PI KBF/2 mil PFA/2 mil PI KBF/5 mil PFA/2 mil PI KBF/2 mil PFA/1 mil PI KBF, fuse-bonded | 43.5 | 126.1 | 270.6 |
| BS17 | [1 mil PI KBF/2 mil PFA]$_4$/1 mil PI KBF, fuse-bonded | 42.3 | 125.1 | 332.9 |
| BS17N | [1 mil PIKBF/1 mil PFA]$_4$/1 mil PIKBF, fuse bonded | 35.9 | 153.9 | 282.4 |
| BS18 | [0.5 mil PFA/1 mil PIKBF]$_6$/0.5 mil PFA, fuse-bonded between Cu | 30.8 | 122.9 | 202.1 |
| BS19 | [1 mil PIKBF/0.5 mil PFA]$_4$/1 mil PIKBF, fuse bonded | 29.0 | 168.4 | 228.7 |

PFA is perfluoroalkoxy;
PI ST is Kapton film;
PI KBF is Kapton bagging film

Figure 5:
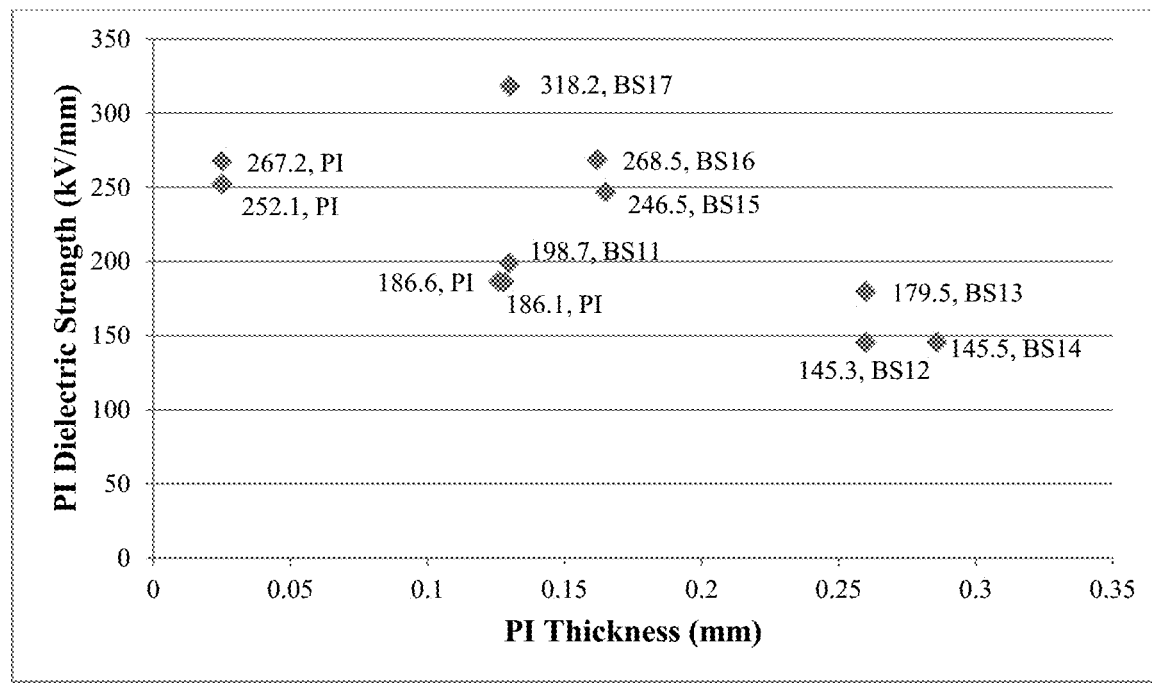
FIG. 5 is a chart of dielectric strength of the polyimide material versus thickness of individual polyimide materials and multilayer insulating composites including the same polyimide materials.

As shown in FIG. 5, and indicated in Table 2, the dielectric strength of polyimide (e.g., Kapton®) can be increased by constructing thin polyimide layers with layers of fluoropolymer (e.g., PFA). The dielectric strength of a polyimide film can be increased in the range of 15 to 75 percent, or preferably greater than 20, 25, 30, 35, 40, 45 or 50 percent, by constructing thin polyimide layers with layers of fluoropolymer material, as compared to the same polyimide film having a thickness substantially similar, or within 1.5 to 35 percent, 2 to 30 percent, 2.5 to 20 percent or 3 to 10 percent, to that in the multilayer construction.

For example, as can be seen in FIG. 5, a multilayer construct of alternating polyimide and PFA layers, 9 layers in total (5 polyimide and 4 PFA), exhibited a measured dielectric strength of 318.2 kV, wherein the construct contained a polyimide layers totaling a thickness of 0.13 mm. Films made of only polyimide material having a thickness 0.126 and 0.128 mm exhibited measured dielectric strengths of 212.8 and 186.1 kV, respectively. This represented an increase in dielectric strength of the polyimide films of 49.5 to 71 percent at substantially the same thickness, or within 1.5 to 3.2 percent (±0.002 or 0.004 mm).

In another example, a multilayer construct of alternating polyimide (Kapton®) and PFA layers, 7 layers in total (3 polyimide and 4 PFA), exhibited a measured dielectric strength of 246.5 kV, wherein the construct contained a polyimide layers totaling a thickness of 0.165 mm. Films made of only polyimide (Kapton®) material having a thickness 0.126 and 0.128 mm exhibited measured dielectric strengths of 212.8 and 186.1 kV, respectively. This represented an increase in dielectric strength of the polyimide films of 15.8 to 32.4 percent at similar thickness, or within 29 to 31 percent (±0.039 or 0.037 mm).

In further example, a multilayer construct of alternating polyimide (Kapton®) and PFA layers, 7 layers in total (4 polyimide and 3 PFA), exhibited a measured dielectric strength of 268.5 kV, wherein the construct contained a polyimide layers totaling a thickness of 0.162 mm. As noted above, polyimide (Kapton®) films having a thickness 0.126 and 0.128 mm exhibited measured dielectric strengths of 212.8 and 186.1 kV, respectively. This represented an increase in dielectric strength of the polyimide films of 26.2 to 44.3 percent at similar thickness, or within 26.5 to 28.5 percent (±0.036 or 0.034 mm).

Figure 3:
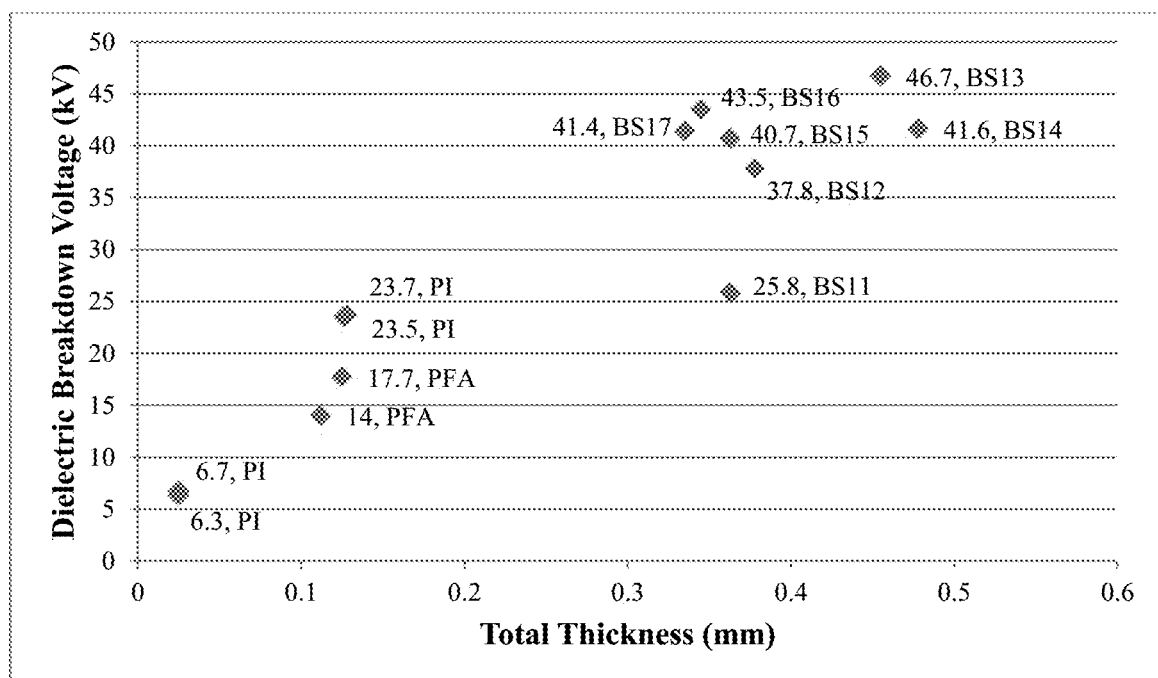
FIG. 3 is a chart of dielectric breakdown voltage versus total thickness of individual materials or multilayer insulating composites including the materials.
Figure 4:
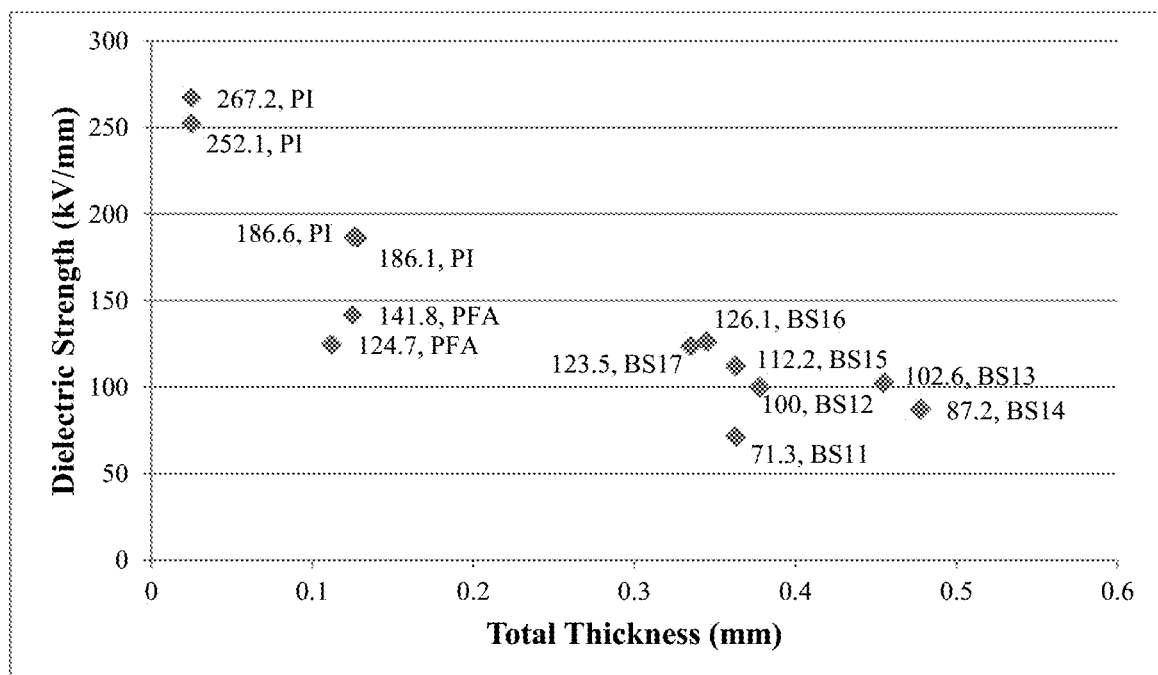
FIG. 4 is a chart of dielectric strength versus thickness of individual materials and multilayer insulating composites including the materials.

The multilayer construct of alternating layers, as shown in FIG. 3, can have an overall or total thickness (mm) in the range of 0.17 mm to 0.5 mm and exhibit a dielectric breakdown voltage of from 25.8 kV to 46.7 kV. In particular examples, the multilayer construct exhibits a dielectric breakdown voltage of about 40 kV or more in a total thickness range of about 0.3 mm to about 0.5 mm.

The multilayer construct of alternating layers, as shown in FIG. 5, can have a total polyimide thickness (mm) in the range of 0.125 mm to 0.29 mm and exhibit a dielectric breakdown voltage of from 25.8 kV to 46.7 kV. In particular examples, the multilayer construct exhibits a dielectric breakdown voltage of about 40 kV or more in a total polyimide thickness range of about 0.13 mm to about 0.29 mm. For example, sample BS17 has a total polyimide thickness of 0.13 mm and a dielectric breakdown voltage of 42.3 kV and thus the multilayer construct can have a total polyimide thickness in the range of 0.12 mm to 0.15 mm and a dielectric breakdown voltage of 35 or 40 kV or more. In another example, BS16 has a total polyimide thickness of 0.16 mm and a dielectric breakdown voltage of 43.5 kV.

In comparison, a single polyimide layer having a thickness of 0.12 mm to 0.13 mm, for example PI KBF, exhibits a dielectric breakdown voltage of 23 kV to 24 kV, which is about 44 percent less than exhibited by BS17 that has substantially the same polyimide thickness as PI KBF. That is, BS17 exhibited an improvement in dielectric breakdown voltage of about 76 percent as compared to PI KBF. In other words, the multilayer construct of alternating layers having a polyimide total thickness of 0.12 mm to 0.13 mm can have a dielectric breakdown voltage improvement of 49 to 76 percent as compared to a single polyimide layer having a thickness of 0.12 mm to 0.13 mm (e.g., BS17, BS17N), wherein the total thickness of the multilayer construct is in the range of 0.2 to 0.4 mm. For instance, the multilayer construct can have a total number of alternating layers in the range of 3 to 10 layers.

Tables 3 and 4 below additionally tabulate the measured data from evaluating the remaining test coupons.

TABLE 3

| Sample | Layer Sequence/Condition | Thickness (mm) | | | | | |
|---|---|---|---|---|---|---|---|
| | | Total | PFA | HN | HPP | PI | PET |
| PET | PET, 2 mil (0.0508 mm) | 0.053 | | | | | 0.053 |
| PFA | PFA0.5, 0.5 mil (0.0127 mm) | 0.013 | 0.013 | | | | |
| PFA | PFA1, 1 mil (0.0254 mm) | 0.025 | 0.025 | | | | |
| PFA | PFA2, 2 mil (0.0508 mm) | 0.052 | 0.052 | | | | |
| PFA | PFA5, 5 mil (0.127 mm) | 0.125 | 0.125 | | | | |
| PFA | PFA5, 5 mil, exposed to 350° C. for 8 min. | 0.112 | 0.112 | | | | |
| PI ST | PI ST, 2 mil (0.0508 mm) | 0.05 | | | | 0.05 | |
| PI ST | PI ST, 2 mil, pre-shrunk at 350° C. for 8 min. | 0.055 | | | | 0.055 | |
| PI KBF | PI KBF1, 1 mil (0.0254 mm) | 0.025 | | | | 0.025 | |
| PI KBF | PI KBF1, 1 mil, exposed to 350° C. for 8 min. | 0.025 | | | | 0.025 | |
| PI KBF | PI KBF2, 2 mil | 0.051 | | | | 0.051 | |
| PI KBF | PI KBF5, 5 mil | 0.126 | | | | 0.126 | |
| PI KBF | PI KBF5, 5 mil, exposed to 350° C. for 8 min. | 0.128 | | | | 0.128 | |
| PI-HN | 30HN, 0.3 mil (0.0076 mm) | 0.008 | | 0.008 | | | |
| PI-HN | 30HN, 0.3 mil (0.0076 mm), exposed to 350° C. for 8 min. | 0.008 | | 0.008 | | | |
| PI-HPP | 50HPP, 0.5 mil (0.0127 mm) | 0.013 | | | 0.013 | | |
| PI-HPP | 50HPP, 0.5 mil (0.0127 mm), exposed to 350° C. for 8 min. | 0.013 | | | 0.013 | | |
| PI-HN | 100HN, 1 mil (0.0254 mm) | 0.025 | | 0.025 | | | |
| PI-HN | 500HN, 5 mil (0.127 mm) | 0.126 | | 0.126 | | | |
| BS17-2 | [100 HN/1 mil PFA]$_6$/ 100 HN, fuse bonded | 0.323 | 0.145 | 0.178 | | | |
| BS20 | [30HN/PFA0.5]$_{16}$ + 30HN, fuse bonded | 0.35 | 0.220 | 0.130 | | | |
| BS20S | [30HN/PFA0.5]$_4$ + 30HN, fuse bonded | 0.091 | 0.053 | 0.038 | | | |
| BS21 | [50HPP/PFA0.5]$_9$ + 50HPP, fuse bonded | 0.255 | 0.128 | | 0.127 | | |
| BS22 | [50HPP/PFA1]$_9$ + 50HPP, fuse bonded | 0.388 | 0.261 | | 0.127 | | |
| BS22-2 | [50HPP/PFA1]$_9$ + 50HPP, fuse bonded | 0.38 | 0.253 | | 0.127 | | |
| BS22-3 | [50HPP/PFA1]$_4$/ PIKBF2/[PFA1/ 50HPP]$_4$, fuse bonded | 0.37 | 0.218 | | 0.152 | | |
| BS23N | [PIKBF1/PET]$_4$ + PIKBF1, fuse bonded | 0.152 | | | | 0.127 | 0.025 |
| BS23 | [PIKBF1/PET]$_4$ + PIKBF1, fuse bonded | 0.21 | | | | 0.127 | 0.083 |

PET is poly(ethylene terephthalate);
PFA is perfluoroalkoxy; PI ST is Kapton film;
PI KBF is Kapton bagging film;
PI-HN is Kapton HN;
PI-HPP is Kapton HPP.

TABLE 4

| Sample | Layer Sequence/Condition | Avg. Voltage, kV | Avg. Strength, kV/mm | Avg. Strength by PI, kV/mm |
|---|---|---|---|---|
| PET | PET, 2 mil (0.0508 mm) | 8.0 | 151.7 | |
| PFA | PFA0.5, 0.5 mil (0.0127 mm) | 4.8 | 382.6 | |
| PFA | PFA1, 1 mil (0.0254 mm) | 8.1 | 320.3 | |
| PFA | PFA2, 2 mil (0.0508 mm) | 10.7 | 204.8 | |
| PFA | PFA5, 5 mil (0.127 mm) | 17.7 | 141.8 | |
| PFA | PFA5, 5 mil, exposed to 350° C. for 8 min. | 14.0 | 124.7 | |
| PI ST | PI ST, 2 mil (0.0508 mm) | 10.2 | 203.7 | |
| PI ST | PI ST, 2 mil, pre-shrunk at 350° C. for 8 min. | 9.9 | 179.4 | |

TABLE 4-continued

| Sample | Layer Sequence/Condition | Avg. Voltage, kV | Avg. Strength, kV/mm | Avg. Strength by PI, kV/mm |
|---|---|---|---|---|
| PI KBF | PI KBF1, 1 mil (0.0254 mm) | 6.3 | 252.1 | 252.1 |
| PI KBF | PI KBF1, 1 mil, exposed to 350° C. for 8 min. | 6.7 | 267.2 | 267.2 |
| PI KBF | PI KBF2, 2 mil | 10.4 | 207.6 | 207.6 |
| PI KBF | PI KBF5, 5 mil | 23.5 | 186.6 | 186.6 |
| PI KBF | PI KBF5, 5 mil, exposed to 350° C. for 8 min. | 23.7 | 186.1 | 186.1 |
| PI-HN | 30HN, 0.3 mil (0.0076 mm) | 2.4 | 315.8 | 315.8 |
| PI-HN | 30HN, 0.3 mil (0.0076 mm), exposed to 350° C. for 8 min. | 2.7 | 355.3 | 355.3 |
| PI-HPP | 50HPP, 0.5 mil (0.0127 mm) | 4.7 | 368.8 | 368.8 |
| PI-HPP | 50HPP, 0.5 mil (0.0127 mm), exposed to 350° C. for 8 min. | 4.7 | 369.3 | 369.3 |
| PI-HN | 100HN, 1 mil (0.0254 mm) | 6.6 | 258.7 | 258.7 |
| PI-HN | 500HN, 5 mil (0.127 mm) | 23.3 | 184.6 | 184.6 |
| BS17-2 | [100 HN/1 mil PFA]$_6$/100 HN, fuse bonded | 45.1 | 139.5 | 242.4 |
| BS20 | [30HN/PFA0.5]$_{16}$ + 30HN, fuse bonded | 38.3 | 109.6 | 295.8 |
| BS20S | [30HN/PFA0.5]$_4$ + 30HN, fuse bonded | 15.4 | 173.1 | 404.4 |
| BS21 | [50HPP/PFA0.5]$_9$ + 50HPP, fuse bonded | 39.0 | 153.7 | 306.8 |
| BS22 | [50HPP/PFA1]$_9$ + 50HPP, fuse bonded | 43.2 | 111.9 | 340.3 |
| BS22-2 | [50HPP/PFA1]$_9$ + 50HPP, fuse bonded | 45.6 | 119.9 | 358.9 |
| BS22-3 | [50HPP/PFA1]$_4$/PIKBF2/[PFA1/50HPP]$_4$, fuse bonded | 45.7 | 123.5 | 281.9 |
| BS23N | [PIKBF1/PET]$_4$ + PIKBF1, fuse bonded | 27.43 | 137.1 | 256.2 |
| BS23 | [PIKBF1/PET]$_4$ + PIKBF1, fuse bonded | 30.5 | 141.4 | 217.3 |

PET is poly(ethylene terephthalate);
PFA is perfluoroalkoxy;
PI ST is Kapton film;
PI KBF is Kapton bagging film;
PI-HN is Kapton HN;
PI-HPP is Kapton HPP.

Figure 8:
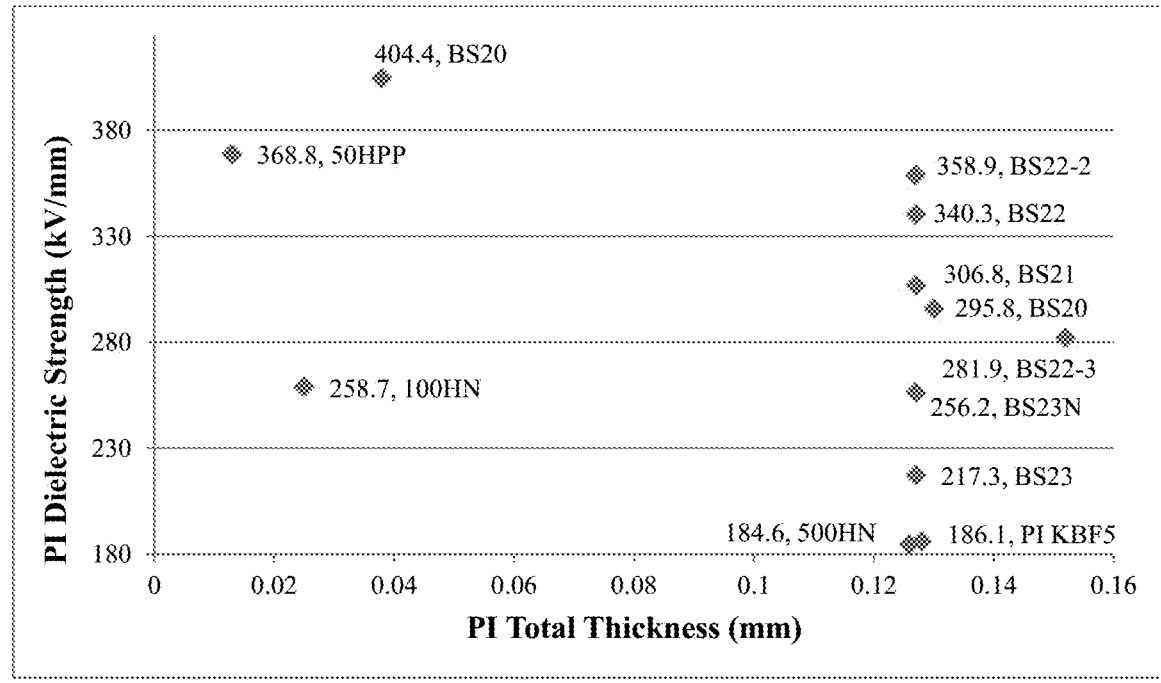
FIG. 8 is a chart of dielectric strength of the polyimide material versus thickness of individual polyimide materials and multilayer insulating composites including the same polyimide materials. Note that all dielectric breakdown voltage data plotted in FIGS. 3 through 8 were obtained by following the ASTM (American Society for Testing and Materials) D149 standard, while tested in an insulating oil, for example, PM-125 phenylmethylsiloxane.
Figure 9:
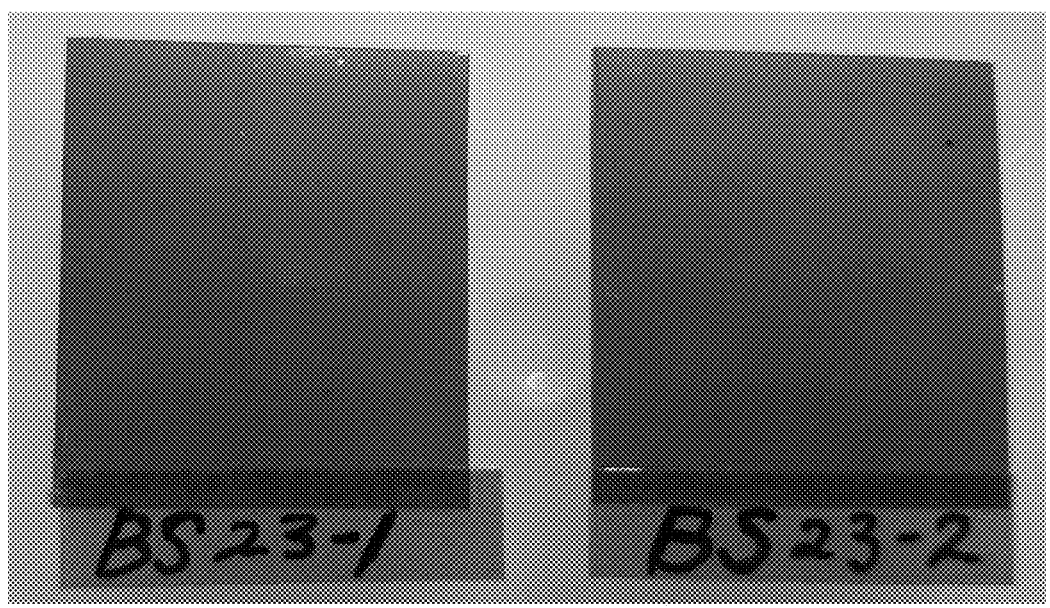
FIG. 9 shows two 1-inch by 1.25-inch test coupons fabricated by heat compression.

As shown in FIG. 8, and indicated in Tables 3 and 4, the dielectric strength of polyimide (e.g., Kapton®) can be increased by constructing thin polyimide layers with layers of fluoropolymer (e.g., PFA) and polyethylenes (e.g., poly(ethylene terephthalate) (PET)). The dielectric strength of a polyimide film can be increased in the range of 15 to 95 percent, or preferably greater than 20, 25, 30, 35, 40, 50, 60, 70 or 80 percent, by constructing thin polyimide layers with layers of fluoropolymer or polyethylene polymer material (e.g., alternating), as compared to the same or a polyimide film having a thickness substantially similar, or within 0.5 to 5 percent, 1 to 4 percent, 1.5 to 3.5 percent or 2 to 3 percent, to that in the multilayer construction.

For example, as can be seen in FIG. 8, a multilayer construct of alternating polyimide and PFA layers, 33 layers in total (17 polyimide (Kapton® HN) and 16 PFA), exhibited a measured dielectric strength of 295.8 kV, wherein the construct contained a polyimide layers totaling a thickness of 0.13 mm. Film made of only polyimide (Kapton® HN) material having a thickness 0.126 exhibited measured a dielectric strength of 184.6 kV. This represented an increase in dielectric strength of the polyimide films of 60.2 percent at substantially the same thickness, or within 3.2 percent (±0.004 mm).

In another example, a multilayer constructs of alternating polyimide)(Kapton® and PFA layers, 19 layers in total (10 polyimide (Kapton® HPP) and 9 PFA), exhibited measured dielectric strengths of 306.8, 251.8, and 340.3 kV, wherein the construct contained a polyimide layers totaling a thickness of 0.127 mm. Films made of only polyimide (Kapton®) material having a thickness 0.126 and 0.128 mm exhibited measured dielectric strengths of 212.8 and 186.1 kV, respectively. This represented an increase in dielectric strength of the polyimide films of 18.3 to 82.9 percent at similar thickness, or within 0.8 percent (±0.001 mm).

In further example, a multilayer construct of alternating polyimide (Kapton®) and PET layers, 9 layers in total (5 polyimide (Kapton bagging film) and 4 PET), exhibited a measured dielectric strength of 256.2 kV, wherein the construct contained a polyimide layers totaling a thickness of 0.0127 mm. As noted above, polyimide (Kapton®) films having a thickness 0.126 and 0.128 mm exhibited measured dielectric strengths of 212.8 and 186.1 kV, respectively. This represented an increase in dielectric strength of the polyimide films of 20.4 to 37.7 percent at similar thickness, or within 0.8 percent (±0.001 mm).

In further example, a multilayer construct of alternating polyimide (Kapton) and PFA layers, 19 layers in total (10 polyimide (Kapton® HPP) and 9 PFA), exhibited a measured dielectric strength of 358.9 kV, wherein the construct contained a polyimide layers totaling a thickness of 0.0127 mm. As noted above, polyimide (Kapton®) films having a thickness 0.126 and 0.128 mm exhibited measured dielectric strengths of 212.8 and 186.1 kV, respectively. This represented an increase in dielectric strength of the polyimide films of about 69 to about 93 percent at similar thickness, or within 0.8 percent (±0.001 mm).

Figure 6:
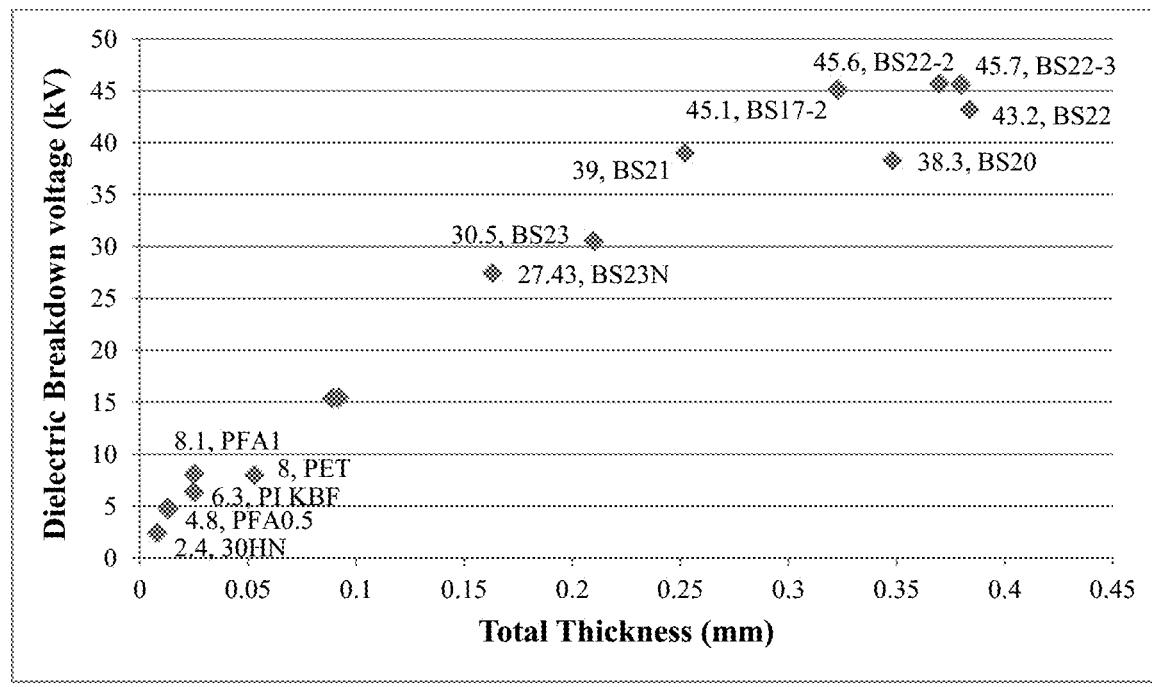
FIG. 6 is a chart of dielectric breakdown voltage versus thickness of individual materials and multilayer insulating composites including the materials.
Figure 7:
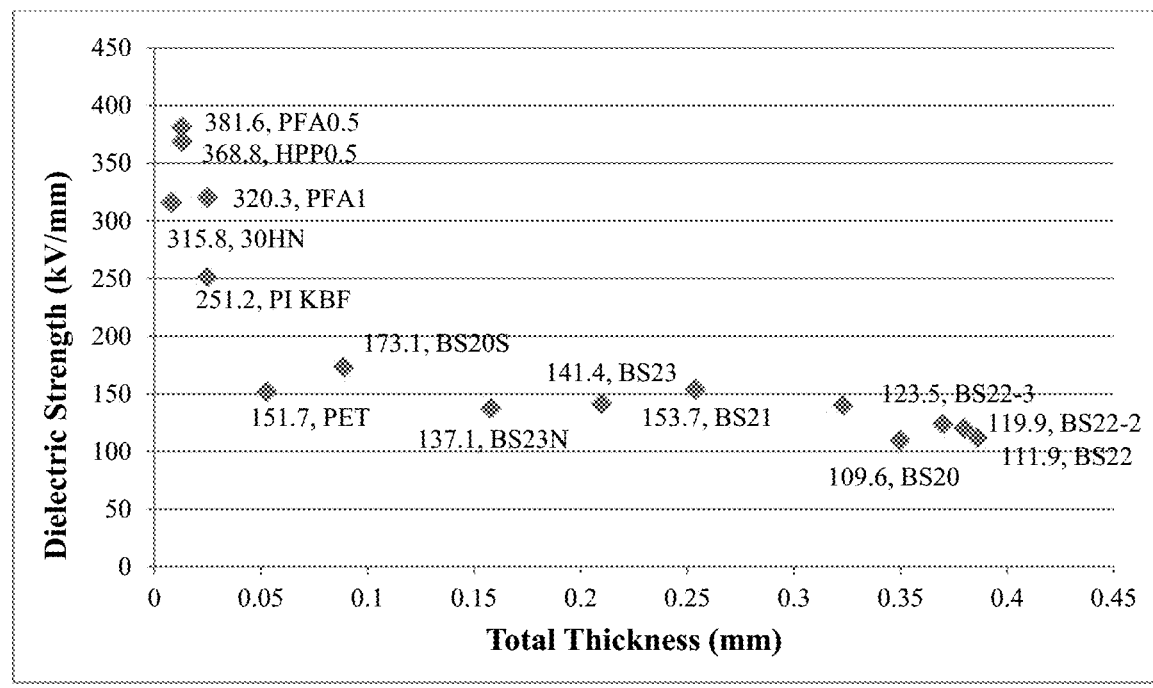
FIG. 7 is a chart of dielectric strength versus thickness of individual materials and multilayer insulating composites including the materials.

The multilayer construct of alternating layers, as shown in FIG. 6, can have an overall or total thickness (mm) in the range of 0.09 mm to 0.39 mm and exhibit a dielectric breakdown voltage of from 15.4 kV to 45.7 kV. In particular examples, the multilayer construct exhibits a dielectric breakdown voltage of about 40 kV or more in a total thickness range of about 0.32 mm to about 0.4 mm.

The multilayer construct of alternating layers, as shown in FIG. 8, can have a total polyimide thickness (mm) in the range of 0.125 mm to 0.18 mm and exhibit a dielectric breakdown voltage of from 38.3 kV to 45.7 kV (e.g., BS17-2, BS20, BS21, BS22, BS22-2 and BS22-3). In particular examples, the multilayer construct exhibits a dielectric breakdown voltage of about 38 kV or 40 kV or more in a total polyimide thickness range of about 0.12 mm to about 0.2 mm. For example, sample BS22-2 has a total polyimide thickness of 0.13 mm and a dielectric breakdown voltage of 45.6 kV and thus the multilayer construct can have a total polyimide thickness in the range of 0.12 mm to 0.18 mm and a dielectric breakdown voltage of 35 or 40 kV or more. In another example, BS22 has a total polyimide thickness of 0.13 mm and a dielectric breakdown voltage of 43.2 kV.

In comparison, a single polyimide layer having a thickness of 0.12 mm to 0.13 mm, for example PI KBF5 or PI 500HN, exhibits a dielectric breakdown voltage of 23 kV to 24 kV, which is about 47 percent less than exhibited by BS22-2 that has substantially the same polyimide thickness as PI KBF5 or PI 500HN. That is, BS22-2 exhibited an improvement in dielectric breakdown voltage of about 90 percent as compared to PI KBF5 or PI 500HN. In other words, the multilayer construct of alternating layers having a polyimide total thickness of 0.12 mm to 0.18 mm can have a dielectric breakdown voltage improvement of 60 to 90 percent as compared to a single polyimide layer having a thickness of 0.12 mm to 0.13 mm. The multilayer construct can have a total thickness of 0.25 mm to 0.4 mm. For instance, the multilayer construct can have a total number of alternating layers in the range of 12 to 20 layers.

It will be understood that this invention is not limited to the above-described embodiments. Those skilled in the art having the benefit of the teachings of the present invention as hereinabove set forth, can effect numerous modifications thereto. These modifications are to be construed as being encompassed with the scope of the present invention as set forth in the appended claims.

What is claimed:

1. An insulated conductor comprising:
   a conductor having an outer surface;
   a multilayer insulating composite comprising an inner insulating polymeric layer, a plurality of intermediate insulating polymeric layers and an outer insulating polymeric layer, the multilayer insulating composite comprising an overall thickness of from 0.2 mm to 0.5 mm, and the multilayer insulating composite comprising multiple polyimide layers comprising an overall total polyimide thickness of from 0.1 mm to 0.3 mm;
   the inner insulating polymeric layer having a thickness of from 0.01 mm to 0.15 mm overlying the outer surface of the conductor;
   the plurality of intermediate insulating polymeric layers comprising a first intermediate insulating polymeric layer overlying the inner insulating polymeric layer and an outermost intermediate insulating polymeric layer, wherein the plurality of intermediate insulating polymeric layers comprises greater than 3 layers;
   the outer insulating polymeric layer having a thickness of from 0.01 mm to 0.15 mm overlying the outermost intermediate insulating polymeric layer of the plurality of intermediate insulating polymeric layers,
   wherein the multilayer insulating composite comprises a dielectric breakdown voltage of from 25 kV to 50 kV or a dielectric strength of from 80 kV/mm to 130 kV/mm.

2. The insulated conductor of claim 1, wherein the multilayer insulating composite comprises 3 or more individual polyimide layers, the 3 or more individual polyimide layers not being in contact with one another.

3. The insulated conductor of claim 1, wherein the inner insulating layer and the outer insulating layer of the multilayer insulating composite comprise the same polymeric material.

4. The insulated conductor of claim 3, wherein the polymeric material comprises fluorine-containing polymer.

5. The insulated conductor of claim 3, wherein the polymeric material comprises a polyimide polymer.

6. The insulated conductor of claim 1, wherein the inner insulating layer, the plurality of intermediate insulating layers and the outer insulating layer of the multilayer insulating composite each comprise at least one polymeric material selected from the group consisting of a fluorine-containing polymer, a polyimide polymer, polyethylene terephthalate polymer and a polyethylene polymer.

7. The insulated conductor of claim 1, wherein the inner insulating layer is in direct bonding with the conductor, the first intermediate insulating layer is in direct bonding with the inner insulating layer, and the outermost intermediate insulating layer of the plurality of intermediate insulating layers is in direct bonding with the outer insulating layer.

8. The insulated conductor of claim 1, wherein the plurality of insulating layers further comprises a second intermediate insulating layer positioned between the first intermediate insulating layer and the outermost intermediate insulating layer, wherein the plurality of intermediate insulating layers comprises an overall thickness of from 0.1 mm to 0.4 mm.

9. The insulated conductor of claim 8, wherein the plurality of intermediate insulating layers further comprises a third intermediate insulating layer positioned between the second intermediate insulating layer and the outermost intermediate insulating layer.

10. The insulated conductor of claim 1, wherein the multilayer insulating composite comprises an operative temperature of from 220° C. to 300° C.

11. The insulated conductor of claim 1, wherein the multilayer insulating composite comprises a dielectric breakdown voltage greater than 30 kV.

12. The insulated conductor of claim 1, wherein the multilayer insulating composite comprises 3 or more individual polyimide layers, and the multilayer insulating composite comprising a dielectric strength 15 percent or more as compared to a single layer of the same polyimide material having the same thickness as the total polyimide thickness of the multilayer insulating composite, wherein the 3 or more individual polyimide layers each comprise a thickness of from 0.01 mm to 0.15 mm.

13. The insulated conductor of claim 1, wherein the multilayer insulating composite comprises 3 or more individual polyimide layers, and the multilayer insulating composite comprising a dielectric breakdown voltage 49 percent or more as compared to a single layer of the same polyimide material having the same thickness as the total polyimide thickness of the multilayer insulating composite.

14. The insulated conductor of claim 1, wherein the inner insulating layer comprises fluorine-containing polymer, the first intermediate insulating layer and the outermost intermediate insulating layer both comprise a polyimide polymer, and the outer insulating layer comprises the fluorine-containing polymer, wherein no insulating layer of the multilayer insulating composite comprises a thickness of more than 0.15 mm.

15. The insulated conductor of claim 14, wherein the fluorine-containing polymer is perfluoroalkoxy (PFA).

16. The insulated conductor of claim 14, wherein the polyimide polymer is poly (4,4'-oxydiphenylene-pyromellitimide).

17. The insulated conductor of claim 1, wherein the insulated conductor is installed in an aircraft.

18. A cable comprising a core, the core comprising a plurality of insulated wires, wherein each of the plurality of insulated wires is an insulated conductor according to claim 1 and the plurality of insulated wires are stranded together; and a sheath covering the core.

19. An electrical insulator comprising:
a multilayer insulating composite comprising an inner insulating polymeric layer for overlying a substrate, a plurality of 3 to 33 intermediate insulating polymeric layers overlying the inner insulating polymeric layer, and an outer insulating polymeric layer overlying the plurality of intermediate insulating polymeric layers, wherein the multilayer insulating composite comprises an overall thickness of from 0.2 mm to 0.5 mm and the multilayer insulating composite comprises a dielectric breakdown voltage of from 25 kV to 50 kV, the multilayer insulating composite further comprising multiple polyimide layers comprising an overall total polyimide thickness of from 0.1 mm to 0.3 mm;
the inner insulating polymeric layer having a thickness of from 0.01 mm to 0.15 mm and comprising a fluorine-containing polymer or a polyimide polymer; and
the outer insulating layer having a thickness of from 0.01 mm to 0.15 mm and comprising a fluorine-containing polymer or a polyimide polymer.

20. The electrical insulator of claim 19, wherein the multilayer insulating composite comprises a dielectric strength of from 80 kV/mm to 130 kV/mm.

21. The electrical insulator of claim 19, wherein the substrate is a wire.

22. The electrical insulator of claim 19, wherein the inner insulating polymeric layer and the outer insulating polymeric layer comprise the same polymeric material.

23. The electrical insulator of claim 22, wherein the plurality of intermediate polymeric layers comprises a first intermediate polymeric layer and an outermost intermediate polymeric layer, the first intermediate polymeric layer and the outermost intermediate polymeric layer being made of the same material.

* * * * *